United States Patent [19]
Martin

[11] Patent Number: 5,605,503
[45] Date of Patent: Feb. 25, 1997

[54] SCRUB WASHER

[75] Inventor: Roger L. Martin, Tyler, Tex.

[73] Assignee: Dapec, Inc., Canton, Ga.

[21] Appl. No.: 425,423

[22] Filed: Apr. 20, 1995

[51] Int. Cl.$^6$ ................................................. A22C 21/04
[52] U.S. Cl. ............................... 452/173; 452/90; 452/89
[58] Field of Search .............................. 452/173, 75, 76, 452/87, 88, 89, 90, 91, 92, 93, 63

[56] References Cited

U.S. PATENT DOCUMENTS

| | | | |
|---|---|---|---|
| 2,422,608 | 6/1947 | Albright | 452/89 |
| 2,908,033 | 10/1959 | Zebarth | 452/89 |
| 3,797,068 | 3/1974 | Dillon | 452/76 |

FOREIGN PATENT DOCUMENTS

| | | | |
|---|---|---|---|
| 1262371 | 4/1961 | France | 452/90 |
| 382583 | 11/1964 | Switzerland | 452/90 |

*Primary Examiner*—Willis Little
*Attorney, Agent, or Firm*—Hopkins & Thomas

[57] ABSTRACT

A processing line for the defeathering of birds including a scrub washer (27) positioned upstream from the scalder (28) and picking station (29) of the processing line for precleaning the birds prior to scalding and picking the feathers from the birds. The scrub washer (27) includes a series of flexible fingers (63), which engage the bodies of the birds and ruffle the feathers of the birds to wipe dirt, loose feathers and contaminating material from the bodies of the birds. At the same time the flexible fingers tend to bear against the birds so as to urge contaminating material contained within the visceral cavities of the birds out of the visceral cavities. Spray nozzles (53) apply a fluid spray (54) to the birds to wash any loose feathers, dirt and contaminating matter from the birds. Thereafter, the precleaned birds are passed through a scalder (28) and through a picking station (29) where the feathers are moved from the birds.

11 Claims, 4 Drawing Sheets

SCRUB WASHER

FIELD OF THE INVENTION

The present invention relates in general to the processing of whole birds along a poultry processing line. In particular, the present invention relates to the process of stunning, killing, scalding and defeathering whole birds as the birds are moved by a suspended conveyor line, prior to the process of eviscerating the birds.

BACKGROUND OF THE INVENTION

The processing of whole birds such as chickens, turkeys, etc., through poultry processing plants now has become highly automated. In general, the birds are suspended from overhead conveyor lines and carried by their legs through a series of processing stations where the birds are killed, defeathered, eviscerated and cut-up. For example, the live birds generally are hung on a killing line where they are stunned, killed, scalded and defeathered at automated processing stations along the processing path of the birds before passing to evisceration and cut-up lines for further processing. As the birds are moved along the evisceration line, the birds also are inspected for contamination.

If contamination of any of the birds is detected during the inspection, the contaminated birds must be removed from the main processing line and sent through a reprocessing operation during which the birds typically are cleaned with a solution, such as a chlorine and water solution, and are scrubbed and then inspected again before the birds are allowed to proceed for cut-up and final processing. Such reprocessing increases the time and expense of preparing the birds for the market and reduces the production capacity of the processing line, and if contamination still is detected after reprocessing, the birds must be discarded.

Typically, the birds arrive at the processing plant in a unsanitary, dirty condition, with fecal matter and other contaminants on their feathers. Further, the lower digestive tracts of the birds often are filled with fecal matter that may not be fully evacuated or excreted from the vents of the birds before the birds are processed.

During initial processing, the birds are stunned and killed, after which the birds are passed through a scalder, which typically is a long tank or bath where the birds are immersed in water that is at a temperature of approximately 125°–140°. The purpose of the scalder is to loosen the feather follicles of the birds so that the feathers can be removed by the defeathering machine. The scalder also tends to wash the birds and clean the birds of surface dirt. However, as a result of the handling of the birds as they are stunned, killed, etc., the birds tend to excrete fecal matter, some of which contaminates the feathers of the birds. The birds therefore are exposed to and tend to pickup bacteria and further contamination as they are moved along the killing line.

Spray scalders are also in use, and instead of immersing the birds in heated water, tend to spray the birds with high temperature water to cause the feather follicles to loosen. Such spray scalders generally do not, however, adequately wash and clean the birds of surface contaminants prior to the birds entering the pickers where the feathers of the birds are removed. In addition, the spray scalders do not clean the birds of any material contaminants contained within the digestive tracts of the birds, which contaminants instead tend to remain in and possibly become expelled from the birds as the birds are eviscerated.

Conventional evisceration equipment often is equipped with vacuum means designed to draw off fecal matter and other contaminants from within the visceral cavities of the birds as the birds are eviscerated. The problem with such vacuum systems, however, is that the eviscerating probes tend to limit the action of the vacuums and thus prevent the vacuums from fully evacuating the visceral cavities of the birds of contaminating matter. Thus, the entrails of the birds, which are laid over the birds after evisceration for inspection, sometimes are coated with contaminants such as fecal matter that has not been completely washed away by the sprayers positioned along the evisceration line. If contaminating matter is detected on the entrails, the inspector must reject the birds and the birds must go to reprocessing.

It is estimated that the loss in production of birds in conventional processing plants due to the reprocessing of contaminated birds averages about 3 to 4 percent of the production of the line, which translates to roughly 4 to 5 birds per minute or up to as many as 2,000 birds per day that must be reprocessed or discarded. Thus, it is important for the birds to be as clean as possible before proceeding through evisceration and cut-up to reduce the amount of contamination and thus reduce the number of birds that must be reprocessed.

Accordingly, it can be seen that a need exists for a method and apparatus for processing birds wherein the birds are cleaned of contaminating material on the bodies of the birds and within the intestinal tracts of the birds prior to defeathering the birds so that the birds are substantially cleaned prior to evisceration and inspection, to reduce the amount of loss in production.

SUMMARY OF THE INVENTION

In general, the present invention comprises a scrub washer and method for precleaning birds being carried in spaced series on an overhead conveyor along a poultry processing path. The scrub washer is mounted along the processing path following the initial processing stations where the birds are stunned and killed, positioned immediately preceding the scalder and picking station for removing the feathers from the birds.

The scrub washer includes a pair of opposed wash cabinets mounted on opposite sides of the poultry processing path, straddling the processing path, facing one another and each having a substantially mirror construction of the other. Each of the scrub wash cabinets generally is a substantially rectangularly shaped open-sided box with the open sides of the cabinets facing each other. A pair of guide rods are mounted to the wash cabinets, positioned adjacent and extending along the path of movement of the birds along their processing path. As the birds move along their processing path, carried between the wash cabinets, the shackles which carry the birds tend to engage the guide rails such that any swinging movement of the birds is dampened and the birds are stabilized as they are moved through the scrub washer.

Each of the wash cabinets of the scrub washer includes a series of spray nozzles mounted to the cabinets in spaced series and connected to a fluid supply line for supplying fluid such as hot water to the spray nozzles. The spray nozzles spray the birds with fluid, which typically is heated to a temperature of approximately 120° F., although fluids of much lower temperatures also can be used. The fluid is directed downwardly against the bird and is applied under pressure so as to cause the feathers to be ruffled and to cause dirt and debris trapped within the feathers to be expelled from the birds.

Each wash cabinet further includes a series of flexible fingers mounted on a rotary support and which are long enough so that their distal ends are rotated through the path of movement of the birds between the wash cabinets. The flexible fingers generally are elongated rods formed from a substantially flexible material such as rubber and the exterior surfaces of the fingers include a series of ribs formed therealong. The flexible fingers are arranged in sets or rows mounted at their proximal ends to finger support shafts which, in a preferred embodiment, extend parallel to the processing path. Typically, three to four rows of flexible fingers are mounted within a wash cabinet, arranged at substantially radially spaced intervals. The flexible fingers are of a length such that the distal ends of the fingers extend across the path of movement of the birds between the wash cabinets, with the flexible fingers of the two respective wash cabinets intermeshing.

As the birds are moved along their processing path between the wash cabinets, the birds are engaged by the flexible fingers. The flexible fingers tend to flail outwardly from their axis of rotation in response to centrifugal forces and impact against and rub downwardly along the bodies of the birds. As a result, the ribs of the flexible fingers tend to ruffle the feathers of the birds and wipe loose feathers and collected dirt and debris from the bodies of the bird and enable greater penetration and washing of the birds by the fluid sprays.

The impact of the flexible fingers further tends to cause fecal matter and other contaminating matter contained within the lower digestive tracts of the birds to be extruded or urged out of the vents of the birds. The extruded contaminating material then is washed or expelled from the bodies of the birds by the high velocity fluid sprays. As a result, the birds are substantially precleaned of contaminating matter such as dirt, grime and fecal matter that may be on the feathers of the birds as well as the fecal matter contained within the lower intestinal tracts of the birds.

After passing through the scrub washer, the precleaned birds are carried through the scalder. Typically, the scalder includes an elongated trough containing a bath of heated fluid, such as water, at a temperature of between approximately 120° F. to 140° F. The birds are immersed in the heated fluid of the scalder for a time sufficient to substantially loosen the follicles holding the feathers of the birds without cooking the birds. The scalder bath further washes remaining contaminants from the skin of the birds as the birds are scalded. Immediately after the birds are removed from the scalder, the birds are carried into a picking station that includes a defeathering machine, such as is disclosed in U.S. Pat. No. 4,514,879. The defeathering machine engages and rubs the feathers from the birds to complete the defeathering of the birds prior to evisceration and cutup.

Accordingly, it is an object of the present invention to provide a processing line for the defeathering of birds along which the birds are precleaned both internally and externally of contaminating material prior to evisceration and cutup.

It is another object of the present invention to provide an improved method and apparatus for defeathering and substantially cleaning birds of contaminating material as the birds are processed through a poultry processing plant to reduce the instance of reprocessing and loss of production of birds through the processing plant.

Another object of the present invention is to provide an improved method for automatically cleaning and defeathering birds wherein the birds are substantially precleaned prior to scalding and picking to remove dirt and debris from the bodies of the birds and to remove potentially contaminating fecal material contained within the lower digestive tracts of the birds prior to evisceration and cutup of the birds.

Various additional objects, features, and advantages of the present invention will become apparent to those skilled in the art upon a review of the following detailed description when taken in conjunction with the accompanying drawings.

DETAILED DESCRIPTION OF THE INVENTION

Figure 1:
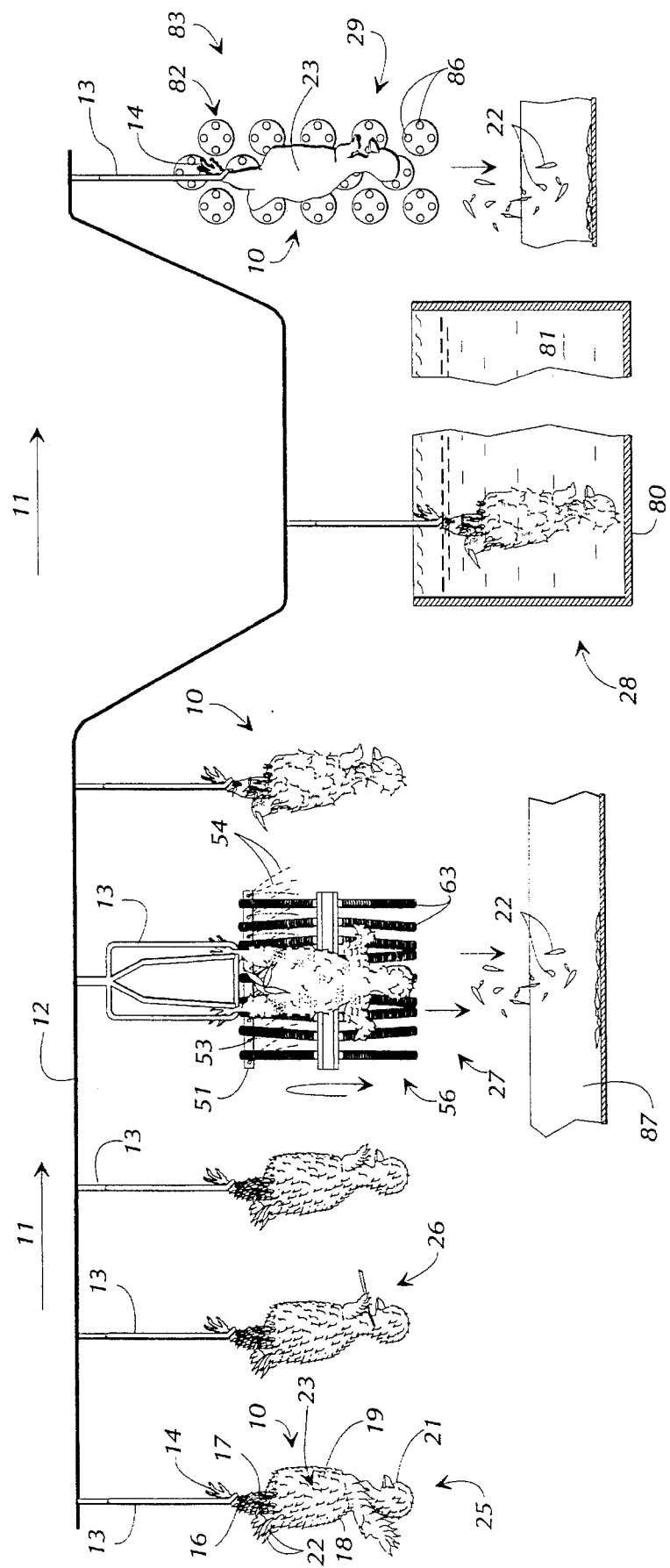
FIG. 1 is a schematic representation of a killing and defeathering line, illustrating the process by which the birds are precleaned of contaminating material, scalded and picked to remove the feathers therefrom.

Referring now to the drawings in greater detail in which like numerals indicate like parts throughout the several views, the present invention relates to a method and apparatus for cleaning and defeathering whole edible birds 10 such as chickens, turkeys, etc. as the birds are conveyed along a processing path 11 suspended from an overhead conveyor line 12 on shackles 13. As shown in FIG. 1, each of the birds 10 include feet 14, legs 16, thighs 17, a back portion 18, breast 19, and generally still include their heads 21 and feathers 22 covering their bodies 23.

FIG. 1 in general schematically illustrates the processing path 11 for the defeathering and cleaning of the birds. As indicated in FIG. 1, the birds initially are hung on the shackles 13 of the overhead conveyor line 12 with their feet 14 received within the shackles and birds hanging in a substantially inverted condition with their heads 21 below their feet. The birds are conveyed along their processing path with their breasts 19 leading their backs 18. The defeathering line includes a series of processing stations positioned along the processing path 11 of the birds, including a stunning station 25 in which the birds are electrically shocked so as to eliminate excess movement by the birds, a killing station 26 in which the birds are killed by the severing of the jugular vein and fluids are drained therefrom, and a scrub washer 27 for substantially precleaning the birds prior to defeathering. Immediately downstream from the scrub washer 27 is a scalder 28 in which the birds are immersed in hot water and scalded to loosen the follicles holding the feathers 22 to the bodies 23 of the birds. A defeathering machine or picker such as disclosed in U.S. Pat. No. 4,514,879 is located in a picking station 29 downstream from the scalder for removal of the feathers from the birds.

Figure 2:
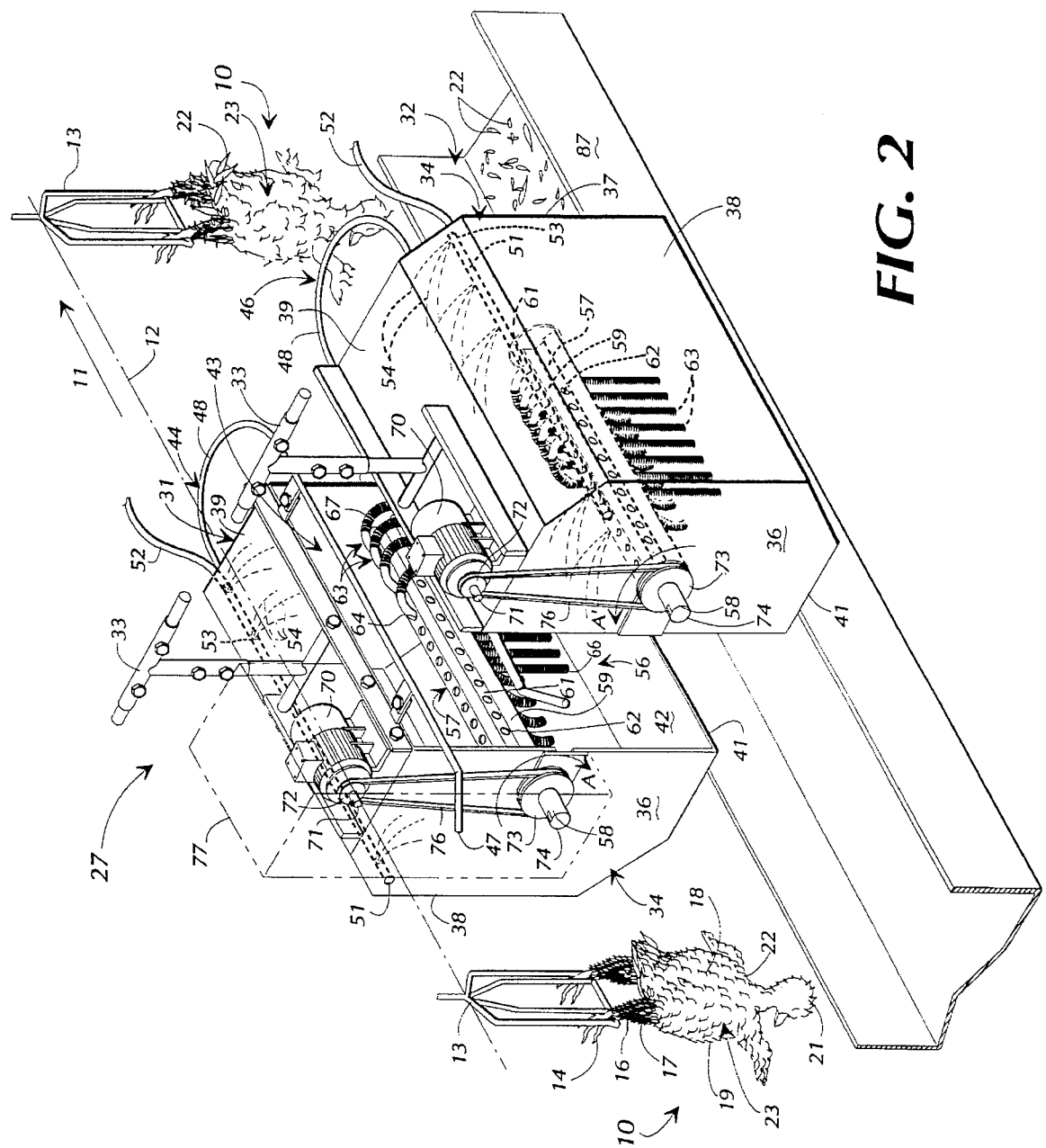
FIG. 2 is a perspective illustration of the scrub washer mounted along the defeathering line.
Figure 3:
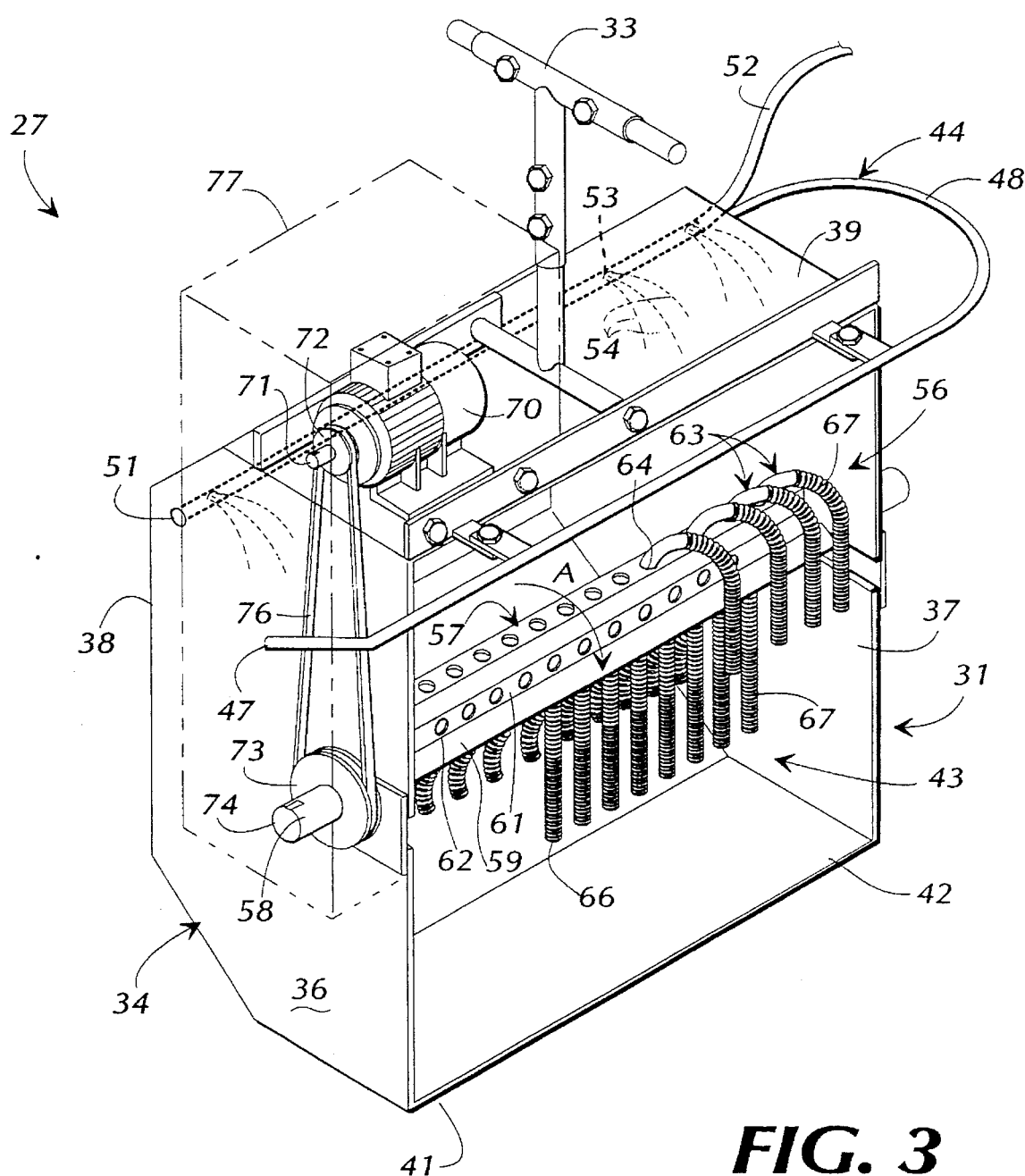
FIG. 3 is a perspective view of one of the wash cabinets of the scrub washer, illustrating the construction of the wash cabinets.
Figure 4:
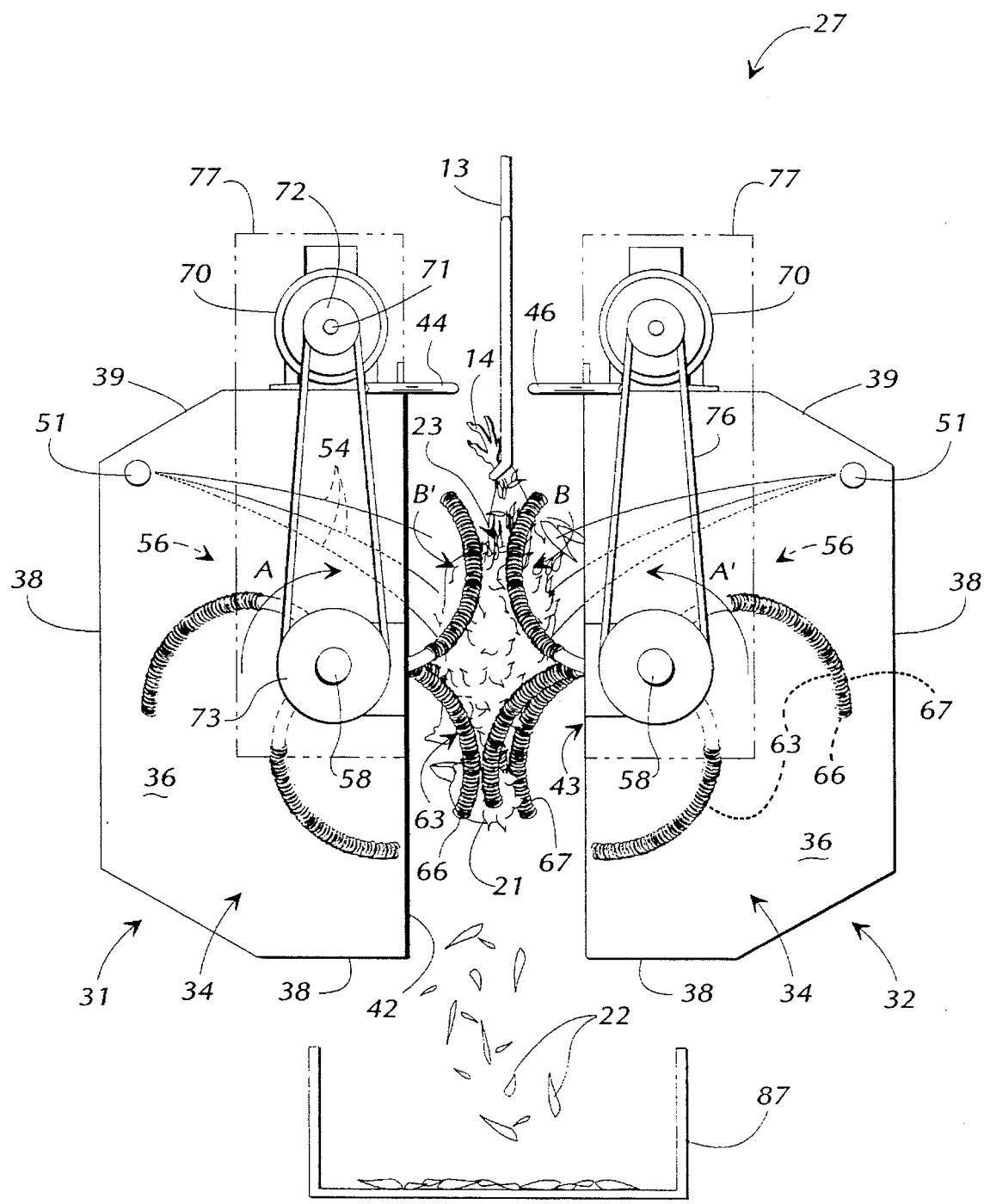
FIG. 4 is an end view of the scrub washer showing the engagement of the flexible fingers and wash sprays with the bodies of the birds.

FIGS. 2, 3 and 4 illustrate in greater detail the scrub washer 27 in which the birds are substantially precleaned of loose feathers, dirt and other contaminating matter that is on the bodies 23 of the birds 10 as well as fecal matter and other contaminants contained within the birds. As shown in FIG. 2, the scrub washer 27 includes a pair of opposed wash cabinets 31 and 32 mounted along and straddling the processing path 11 of the birds 10, positioned on opposite sides of the overhead conveyor line 12 so that the birds pass therebetween. The wash cabinets 31 and 32 each are generally rectangularly shaped boxes and each has a substantially mirror construction of the other. The wash cabinets are suspended by braces or struts 33 from an overhead support (not shown) of the poultry processing plant and are adjusted to a optimal height for engaging and cleaning the birds as the birds pass between the wash cabinets.

Each of the wash cabinets 31 and 32 includes an open-sided housing 34, as shown in FIG. 3, primarily formed from metal such as stainless steel or similar durable, corrosion resistant material. Each housing includes an upstream or proximal side 36, a downstream or distal side 37, rear side surface 38, top surface 39, bottom surface 41 and an open front 42, defining a wash chamber 43.

A pair of guide rails 44 and 46 (FIG. 2) are mounted to the wash cabinets 31 and 32, extending along the length of each wash cabinet and positioned parallel to and extending along the processing path 11 of the birds 10. The guide rails generally are formed from a metal such as stainless steel and include proximal or input ends 47 positioned adjacent the upstream side 36 of the wash cabinets and distal ends 48 that curve outwardly and around the downstream surface 37 of the wash cabinets. As shown in FIG. 2, the proximal ends 47 of the guide rails are flared outwardly from the processing path of the birds, and tend to direct the birds toward the center of the scrub washer. The shackles which carry the birds tend to engage the guide rails 44 and 46 as the birds move between the wash cabinets and are stabilized such that any swinging movement of the birds is dampened and the birds are stabilized and positioned for precleaning by the scrub washer.

As FIGS. 2, 3 and 4 illustrate, a water pipe 51 is mounted within each open-sided wash chamber, extending between the upstream and downstream side surfaces 36 and 37 of the wash cabinets. Typically, the water pipes 51 are pipes or tubes formed from a metal such as copper or steel and each are connected to a fluid supply line 52 at the downstream side of the wash cabinet (FIG. 2). A series of spray nozzles 53 are mounted to the water pipes facing inwardly and downwardly toward the processing line of the birds. As illustrated in FIGS. 2 and 4, the spray nozzles direct sprays or streams of fluid at high velocity against the bodies 23 of the birds 10. In the preferred embodiment, the fluid sprays 54 generally are sprays of water that is heated by a conventional water heater (not shown) to a temperature between 100° F. and 130° F., preferably approximately 120° F., and are applied to the birds from a source under high pressure. However, it is possible to use unheated, cooler temperature fluid, including cold water, for the fluid sprays if so desired. The fluid sprays strike the birds with sufficient velocity to ruffle the feathers and wash away loose feathers, dirt, and other contaminating matter for cleaning the bodies 23 of the birds as shown in FIG. 4, and for cleaning the scrub washer.

A flexible finger assembly 56 is mounted within each of the wash cabinets 31 and 32 facing one another. As shown in FIG. 3, each flexible finger assembly 56 includes a series of flexible finger support brackets 57 mounted about a drive shaft 58 so as to rotate with the rotation of the drive shaft. Typically, three to four finger support brackets 57 are mounted to the drive shaft projecting radially therefrom, and each generally comprise a substantially L-shaped bracket or plate having a vertically extending portion 59 attached to the drive shaft and a horizontal portion 61. A series of bores 62 are formed in the horizontal portion 61 at spaced intervals along the length of the horizontal portion.

As shown in FIGS. 2 and 3, flexible fingers 63 are received within the bores 62 in locking engagement to secure the proximal ends of the flexible fingers to the flexible finger support brackets 57. Each of the flexible fingers 63 generally is an elongated rod formed from a resilient, flexible material such as rubber and generally is approximately 12 to 15 inches in length, although other finger configurations, such as fingers mounted to disks, can be used as desired. Each finger has a first or proximal end 64 received and secured within a bore 62 of the horizontal portion 61 of a finger support bracket 57, and a second or distal end 66. A series of ribs 67 are formed substantially along the length of each finger toward the free end 66 thereof.

As the birds are carried along the processing path between the wash cabinets 31 and 32 and into engagement with the flexible fingers, as shown in FIG. 4, the flexible fingers tend to impact and rub against the bodies 23 of the birds 10. The movement of the flexible fingers along the bodies of the birds tends to ruffle the feathers of the birds and wipe away dirt, fecal matter, loose feathers and other contaminating matter from the bodies of the birds and enable greater penetration and washing by the fluid sprays. The flexibility of the flexible fingers further causes the flexible fingers to flex and flail outwardly in response to centrifugal forces and bear against the bodies of the birds as the flexible fingers are rotated downwardly about the bodies of the birds, causing the sides of the birds to be urged inwardly in the direction of arrows B and B' (FIG. 4). This squeezing action resulting from the impact of the flexible fingers against the sides of the birds causes fecal matter or other contaminating matter contained within the lower digestive tracts of the birds to be extruded or urged out of the visceral cavities of the birds. The contaminating matter thereafter is washed away and expelled from the birds by the fluid sprays 54 and the action of the fingers to substantially preclean the birds of contaminating matter.

As shown in FIGS. 2 and 3, a drive motor 70 is mounted to the top surface 39 of each wash cabinet 31 and 32, connected in a driving relationship to the drive shaft 58 of each picking finger assembly 56. The drive motors 70 generally are conventional electric drive motors of approximately 5 to 10 hp and include drive shaft 71 having a sheave 72 attached thereto. A sheave 73 is mounted to an end 74 of each drive shaft 58 that projects through the upstream side 36 of the housing 34 of each wash cabinet, positioned below the sheave 72 of the drive motor 70. A drive belt 76 is received about the sheaves 72 and 73, connecting the sheaves and thus the drive motor and the drive shaft 58 of each picking finger assembly 56 in a driving relationship. As sheave 72 is rotated by the drive motor, the drive shaft 58 of each picking finger assembly likewise is caused to rotate in the direction of arrows A and A' (FIGS. 2 and 4). The rotation of the drive shafts 58 by the drive motors 70 likewise causes the picking finger support brackets 57, and thus the flexible fingers 63 mounted thereto, to be rotated in the direction of arrows A and A' through the path of movement of the birds between the wash cabinets 31 and 32.

Additionally, as shown in FIG. 2, a cover 77 (shown in phantom) generally is mounted over the drive motor 70 and the sheaves 72 and 73 and drive belt 76 of each wash cabinet 31 and 32. The cover generally is a substantially rectangularly shaped box formed from a metal such as stainless steel, and is mounted about the drive motor in order to protect the drive motor, sheaves and drive belt from direct exposure to loose feathers, dirt and water that could tend to clog or damage the drive motor or cause the drive belt to become unseated from the sheaves or slip and thus disrupt the rotation of the picking finger assemblies into engagement with the birds.

As shown in FIG. 1, downstream from the scrub washer 27 along the processing path 11 of the birds 10 is a scalder 28. Typically, the scalder comprises an elongated scalding tank or trough 80 that generally is formed from metal such as stainless steel and is approximately 75 to 125 feet in length. A hot water bath 81 is contained within the scalding tank 80, with the temperature of the hot water bath generally being within a range of approximately 125° to 140° F., although it will be understood by those skilled in the art that temperature ranges slightly higher or slightly lower than the foregoing range can be used as desired for a particular processing line. The hot water bath 81 within the scalding tank is replenished with a fresh water supply that enters the tank at the downstream end thereof so that as the birds move along the tank, the birds progressively are washed with cleaner water.

The birds pass from the scalder 28 into a picking station 29 to complete the defeathering of the birds 10. Generally, a series of pickers 82 are mounted in the picking station 29, with each picker including a plurality of flexible finger assemblies 83. The flexible finger assemblies 83 are illustrated in FIG. 1 as substantially circular disks 84 having a series of approximately 5 to 6 flexible fingers mounted thereto, although other types of flexible finger assemblies can be used as desired. The flexible fingers 86 generally are formed from a flexible but durable material such as rubber and are rotated with the rotation of their supporting disks as the birds 10 move into engagement therewith. The flexible fingers rub against the bodies of the birds, wiping and pulling the loosened feathers from the feather follicles to defeather the birds. Once the birds have been defeathered in the picking station, the birds then are transferred to an evisceration line for further processing.

OPERATION

In the operation of the processing line 11, as shown in FIG. 1, for the defeathering of birds 10, the birds initially are hung by hand on the shackles 13 on an overhead conveyor line 12 with their feet 14 received within the shackles and their heads hanging downwardly and moved in spaced series by the shackles along a processing path with their breasts leading their backs. The birds first are carried through a stunning station 25 wherein the birds are stunned by an electric charge, to disable the nervous systems of the birds and prevent birds from flopping or moving about on the shackles. The birds then are passed through a killing station 26 where the birds are killed by severing the jugular and blood and other fluids are drained from the birds as the birds continue along their processing path 11. After the birds have been stunned and killed and sufficiently drained of fluids, the birds are turned approximately 90° so that their backs and breasts are aligned along the processing path, as shown in FIG. 1, as the birds are carried into the scrub washer 27 for precleaning the birds.

As the birds enter the scrub washer 27, the shackles which carry the birds tend to contact guide rails 44 and 46 (FIG. 2) mounted to the wash cabinets 31 and 32 of the scrub washer, which tend to dampen swinging motion of the birds, directing the birds inwardly toward the center of the scrub washer and maintaining the birds in a proper alignment for washing. As FIGS. 2 and 4 illustrate, as the birds are received between the wash cabinets 31 and 32 of the scrub washer, high velocity fluid sprays 54 are applied to the birds on each side thereof. The fluid sprays apply high temperature water from a high pressure source against and downwardly along the bodies 23 of the birds 10. The high velocity heated water of the fluid sprays tends to ruffle the feathers 22 of the birds and heat the birds so that the follicles of the feathers loosen to enable loose feathers to be more easily wiped from the birds. Additionally, the fluid sprays tend to wash away any dirt, loose feathers and other contaminants, such as fecal matter collected on the bodies of the birds. Such contaminants are washed downwardly off the birds and through the scrub washer into a drainage trough 87 positioned directly below the scrub washer to collect the waste water and contaminants cleaned from the birds for disposal.

At the same time the fluid sprays 54 are applied to the birds 10, the birds are engaged by the series of intermeshing flexible fingers 63 of opposed flexible finger assemblies 56 of the wash cabinets 31 and 32. As FIG. 4 illustrates, the flexible fingers are rotated into engagement with the birds, engaging the bodies of the birds. The flexible fingers tend to impact against and then flex and bear against the sides of the bodies of the birds as the flexible fingers wipe or scrape downwardly against the direction of the feathers 22. As a result, the feathers 22 of the birds are further ruffled and spread, which enables the fluid sprays 54 to penetrate the feathers and contact the skin of the bodies of the birds and to loosen and wash away encrusted dirt and debris and loose feathers from the bodies 23 of the birds. Thus, the fluid sprays are made more effective for washing the bodies of the birds of dirt, feathers and other contaminating matter for substantially precleaning the birds prior to scalding.

Additionally, the force of the flexible fingers 63 bearing against the bodies 23 of the birds 10 tends to squeeze or compress the bodies of the birds inwardly in the direction of arrows B and B'. This compression of the birds in turn causes any contaminating matter, such as fecal matter, contained within the lower digestive tracts of the birds to be squeezed or extruded out through the vent openings of the birds where such contaminants can be washed and wiped away from the birds by the fluid sprays and the further engagement of the birds by fingers 63 of the scrub washer 27. As a result, the birds are substantially precleaned of dirt, loose feathers and contaminating matter both carried on the outsides of the bodies of the birds as well as contained within the visceral cavities of the birds prior to the birds entering the scalder 28 (FIG. 1). Such substantial precleaning of the birds tends to reduce significantly the amount of contamination remaining in or on the birds which must be washed from the birds by the scalder and substantially reduces the bacterial count within the scalding tank 81 to which the birds are exposed during scalding.

As shown in FIG. 1, after the birds 10 have been substantially precleaned by the scrub washer 27, the birds enter the scalder 28 wherein the birds are immersed within a hot water bath 81 contained within the scalder tank 80. The birds are submerged within the hot water bath of the scalding tank for sufficient time to heat the skin of the birds to sufficient temperature to cause the follicles holding the feathers 22 against the bodies 23 of the birds 10 to loosen their hold on the feathers, but without precooking the birds. Thereafter, the birds pass from the scalding tank into a picking station 29 for the removal of the loosened feathers from the birds. In the picking station 29, the birds are engaged by a series of rotating flexible fingers 86 that rub against the bodies 23 of the birds 10 and cause the feathers 22 to be wiped or rubbed off of the bodies of the birds. The feathers drop away from the birds into a collection trough or bin below the pickers. The picked and cleaned birds thereafter are transferred to an evisceration line for further processing and inspection.

By substantially precleaning the birds prior to scalding, the present invention significantly reduces the amount of contaminating matter that would be carried with the birds through the evisceration process and to which the birds are exposed during scalding so as to significantly reduce the contamination of the birds. As a result, the birds are significantly cleaner when the birds proceed through the evisceration process. Consequently, the birds have a lower incidence of contamination and thus there is correspondingly a lower incidence of rejection of birds from the processing line for contamination that would require reprocessing and potential loss of the birds from the production line. The operation of the present invention has been found to reduce significantly the amount of loss and reprocessing of the birds from approximately 3–4 percent of production down to approximately 1 to ½ percent. This represents a significant savings in both time and expense required for the reprocessing of the birds and leads to a significant increase in capacity of the processing of the birds through a poultry processing plant.

It will be understood by those skilled in the art that various modifications, additions and deletions can be made to the present invention without departing from the spirit and scope of the invention as set forth in the following claims.

I claim:

1. In a method of automatically cleaning and defeathering birds in a poultry processing system comprising the sequential steps of hanging birds by their legs from spaced shackles of a suspended conveyor line, advancing the shackles and the birds suspended by the shackles in spaced series along the conveyor line, and as the birds move along the conveyor line, stunning the birds, severing the jugular of the birds, scalding the birds, and defeathering the birds, the improvement therein comprising:

between the steps of severing the jugular and scalding the birds, applying fluid to the birds and engaging the birds with flailing, flexible members with enough force to cause the birds to excrete matter from the digestive tracts of the birds, and cleaning debris and matter excreted from the digestive tracts of the birds from the birds.

2. The method of claim 1, wherein the step of applying fluid to the birds comprises:

applying streams of heated liquid to the birds at temperatures in a temperature range from 110° F. and 130° F.

3. The method of claim 1 wherein the step of engaging the birds with flailing flexible members comprises:

supporting elongated flexible members each at one end with the other end remaining free, rotating the supported ends of the flexible members about a common axis, and engaging the birds with the free ends of the flexible members.

4. In a method of automatically defeathering cleaning birds wherein the birds are moved in suspended series along a conveyor line in a poultry processing system and as the birds move they are killed, scalded and defeathered, the improvement therein, comprising:

prior to scalding and defeathering the birds, directing streams of fluid into contact with the birds, as the streams of fluid are directed into contact with the birds, impacting the birds with flexible elongated fingers with forces sufficient to spread the feathers of the birds and cause the birds to excrete matter from the digestive tracts of the birds, and moving the flexible fingers along the birds to clean debris, loose feathers and matter excreted from the digestive tracts of the birds from the birds to reduce contaminants within and on the birds prior to scalding and defeathering the birds.

5. The matter of claim 4 wherein the steps of directing streams of fluid into contact with the birds comprises:

heating a liquid to a temperature above 100° F., and directing streams of the heated liquid into bathing contact with the feathers of the birds.

6. A method of automatically cleaning whole killed birds of retained matter in the digestive tracts of the birds as the birds are moved suspended in an inverted attitude along a processing line toward a bird scalder, comprising:

moving the birds through an initial scrub washing station positioned along the processing line;

as the birds move through the initial scrub washing station, impacting the birds with a series of flexible fingers with enough force to cause retained matter in the digestive tracts of the birds to be expelled from the birds, and moving the flexible fingers along the birds to clean debris, loose feathers and matter excreted from the digestive tracts of the birds to reduce contaminants within and on the birds prior to scalding, defeathering and evisceration of the birds.

7. The method of claim 6 and wherein the step of removing the expelled matter from the feathers of the birds comprises applying streams of water under pressure to the birds.

8. The method of claim 6 and wherein the step of impacting the birds with a series of flexible fingers comprises rotating sets of flexible fingers through the processing path of the birds and pressing the fingers against the birds with enough force to urge retained matter within the digestive tracts of the birds out of the vent openings of the birds.

9. The method of claim 7 and wherein the step of removing expelled matter from the feathers of the bird comprises washing the birds with streams of liquid prior to scalding and picking the birds.

10. In a processing line for removing the feathers of birds moving along a processing path suspended with their heads hanging downwardly, including a scalder positioned for receiving the birds and applying a heated fluid to the birds at a temperature and for a time sufficient to loosen the feathers of the birds, and picker means for removing the feathers from the scalded birds to substantially defeather the birds prior to evisceration and cut-up, the improvement therein comprising:

a scrub washing station along the processing path upstream of said scalder for precleaning the birds of loose feathers, dirt and internal contaminants, said scrub washing station comprising a series of elongated flexible fingers, means for rotating said flexible fingers through the processing path of the birds, said flexible fingers being of a length sufficient to ruffle the feathers of the birds and remove loose feathers, dirt, and contaminating material from the exterior of the birds and being rotated into engagement against the birds with sufficient force to urge contaminating matter within the birds out of the visceral openings of the birds for removal with the loose feathers, dirt and contaminating material from the exterior of the birds; and spray nozzles for directing fluid streams against the birds for cleaning the birds as the birds are engaged by said flexible fingers, whereby the birds are substantially cleaned of contaminating matter within and externally of the birds prior to scalding, defeathering, eviscerating and cut-up to substantially reduce the amount of reprocessing required for the birds.

11. The processing line of claim 10 and wherein said flexible fingers of said scrub washing station comprise elongated flexible straps having free ends that impact against the birds as said straps are rotated into engagement with the birds so as to urge contaminating matter within the digestive tracts of the birds out of the visceral openings of the birds.

* * * * *